United States Patent
Dudek et al.

(10) Patent No.: US 6,767,141 B1
(45) Date of Patent: Jul. 27, 2004

(54) OPTICAL INTERFACE UNIT

(75) Inventors: Michael Dudek, Longmont, CO (US); Michael Tartaglia, Thornton, CO (US); Carl Embry, Boulder, CO (US); Mark Stiehl, Lafayette, CO (US); Timothy Bingaman, Thornton, CO (US); Steven Anderson, Broomfield, CO (US); Dale Isaacson, Idaho Springs, CO (US)

(73) Assignee: Optical Communication Products, Inc., Woodland Hills, CA (US)

(*) Notice: Subject to any disclaimer, the term of this patent is extended or adjusted under 35 U.S.C. 154(b) by 127 days.

(21) Appl. No.: 10/012,217

(22) Filed: Dec. 4, 2001

Related U.S. Application Data
(60) Provisional application No. 60/251,149, filed on Dec. 4, 2000.

(51) Int. Cl.[7] ................................................. G02B 6/36
(52) U.S. Cl. ............................. 385/92; 385/91; 385/89; 385/88; 385/53
(58) Field of Search ............................. 385/92, 91, 89, 385/88, 53

(56) References Cited

U.S. PATENT DOCUMENTS

| | | | |
|---|---|---|---|
| 5,619,604 A | * | 4/1997 | Shiflett et al. ................ 385/59 |
| 5,719,978 A | * | 2/1998 | Kakii et al. .................... 385/89 |
| 6,238,100 B1 | * | 5/2001 | Sasaki et al. .................. 385/59 |
| 6,599,032 B1 | * | 7/2003 | Kurashima et al. ........... 385/89 |
| 2002/0076172 A1 | * | 6/2002 | Meyer et al. .................. 385/91 |
| 2003/0072538 A1 | * | 4/2003 | Jin et al. ....................... 385/89 |
| 2003/0113071 A1 | * | 6/2003 | Kim et al. ..................... 385/76 |
| 2003/0138219 A1 | * | 7/2003 | O'Toole et al. ............... 385/92 |

* cited by examiner

*Primary Examiner*—Rodney Bovernick
*Assistant Examiner*—Sung Pak
(74) *Attorney, Agent, or Firm*—Barlow, Josephs & Holmes, Ltd.

(57) ABSTRACT

In an exemplary embodiment of the present invention, an optical interface unit provides an interface between an optoelectronic device and industry standard MTP/MPO connectors. The optical interface unit axially aligns the core of a fiber with the optoelectronic device and interfaces that fiber to the standardized connector. In addition, the optical interface unit further provides a standardized interface for visible contact connection between the individual fiber stubs and the terminated fibers in the standardized connector. The optical interface unit therefore maximizes coupling from the optoelectronic device with the standardized connector.

28 Claims, 12 Drawing Sheets

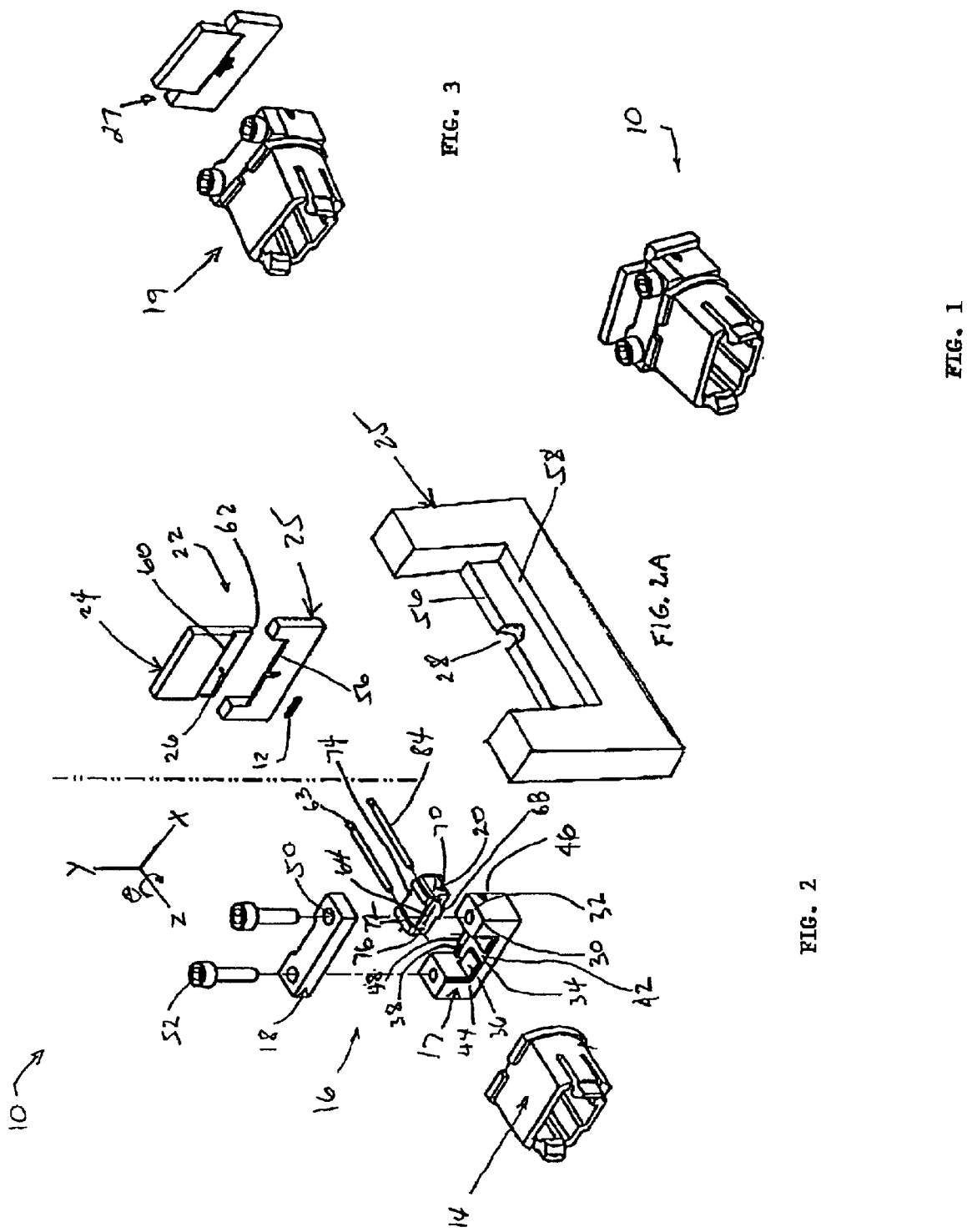

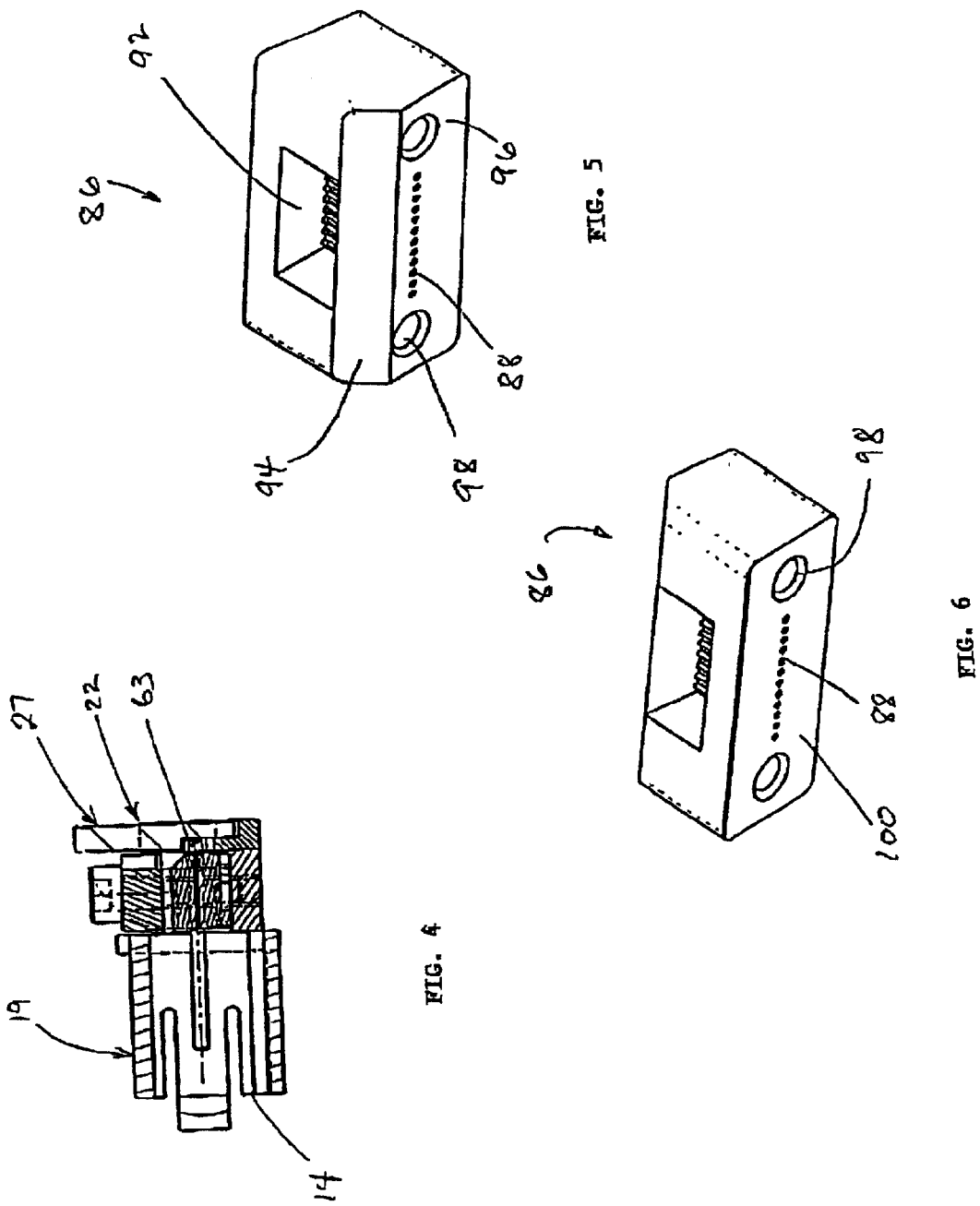

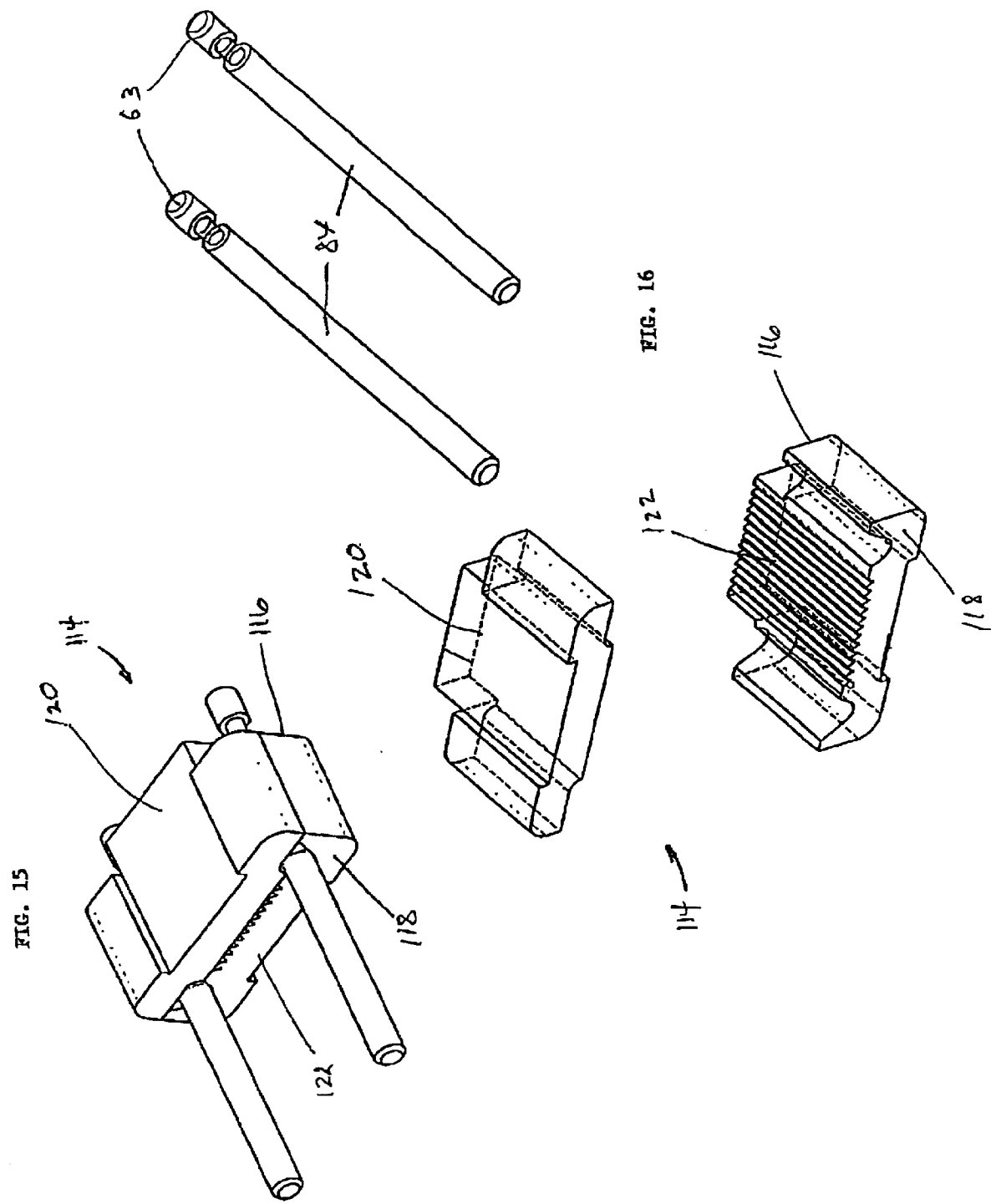

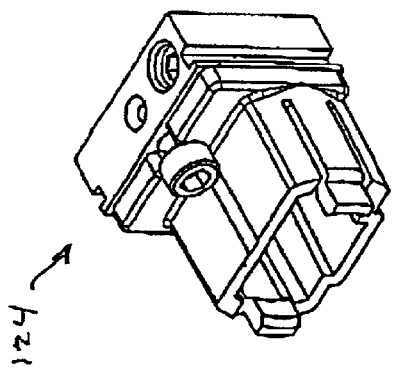
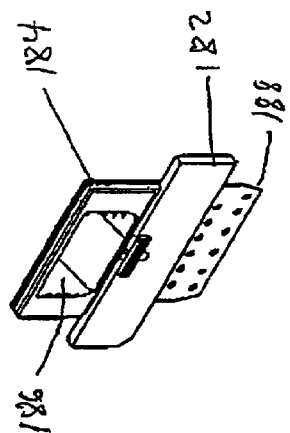
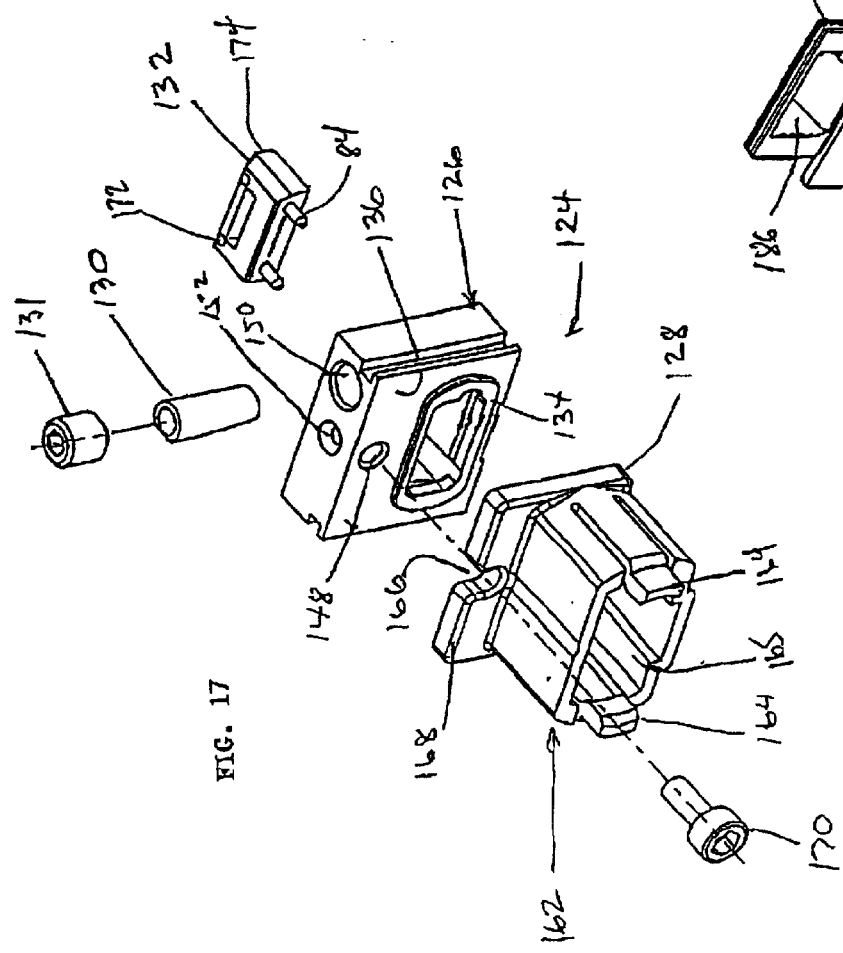

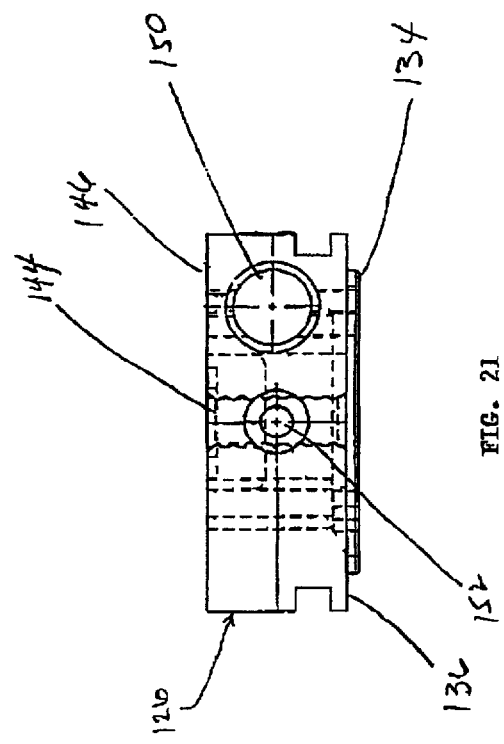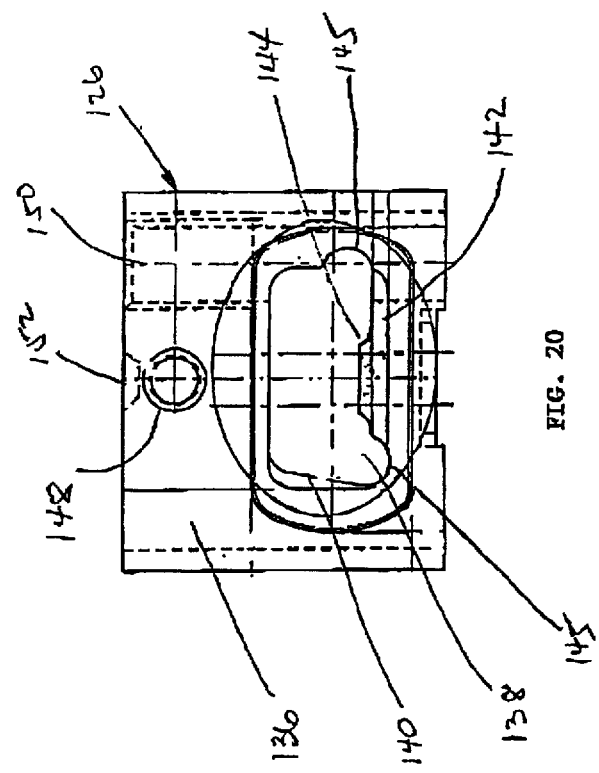

OPTICAL INTERFACE UNIT

CROSS-REFERENCE TO RELATED APPLICATION

The present application claims the benefit of U.S. provisional patent application No. 60/251,149, filed Dec. 4, 2000, the contents of which are hereby expressly incorporated herein by reference.

This invention generally relates to optical interface units, and specifically to an optical interface unit for coupling an optoelectronic device such as a transmitter, receiver, or transceiver to a fiber stub array, and the combination to a conventional fiber optic connector.

BACKGROUND

Optical fiber technology is used in a variety of applications such as telecommunication, computer, and medical applications. The basic elements included in an optical data communications system include a transmitter, optical cable with connectors, and a receiver. The transmitter converts the electrical signal to a light signal that travels through the optical cable to the receiver. The receiver converts the optical signal back into an electrical signal.

The light receiving and emitting ends of the optical fibers are housed in fiber ferrules. The fiber ferrule at the light receiving end of the bundle is coupled to a light detecting device via an optical interface unit. Likewise, the fiber ferrule at the light emitting end of the bundle is coupled to a light emitting device via an optical interface unit.

Several optical interface technologies and consortiums have evolved that provide a standardized interfaces between two optical fiber cables, however, such standardized interfaces do not necessarily provide solutions for the coupling of light between a fiber and an optoelectronic device.

SUMMARY

In an exemplary embodiment of the present invention, an optical interface unit axially aligns the core of a fiber with an optoelectronic device and interfaces that combination fiber and optoelectronic device to a standardized optical connector. The optical interface unit may be optimized to interface with a particular Optical Sub-Assembly design so as to maximize optical coupling between the optoelectronic device and the fiber. In addition, the optical interface device further provides a standardized interface for visible contact connection between the various fiber stubs on the interface unit and the terminated fibers in the standardized connector (which, as discussed below, are generally MT/MPO ferrules attached to fiber ribbon or cable).

BRIEF DESCRIPTION OF THE DRAWINGS

These and other features, aspects, and advantages of the present invention will become better understood with regard to the following description, appended claims, and accompanying drawings where:

FIG. 1 is an isometric view of an interface unit according to the present invention in an assembled configuration;

FIG. 2 is an exploded isometric view of the embodiment of FIG. 1;

FIG. 2A is a reversed isometric view of an optoelectronic plate of FIG. 2;

FIG. 3 is an isometric view of the embodiment of FIG. 1 in a semi-assembled configuration;

FIG. 4 is a cut-away side plan view of the embodiment of FIG. 1;

FIG. 5 is an isometric view of an alternative fiber stub array.

FIG. 6 is a reverse isometric view of the alternative embodiment of FIG. 5;

FIGS. 14–16 are various isometric views of yet another fiber stub array embodiment;

FIG. 17 is an exploded isometric view of a portion of another connector unit embodiment;

FIG. 18 is an isometric view of an exemplary optoelectronic plate mounted to a flex circuit;

FIG. 19 is an isometric view of the embodiment of FIG. 17 in an assembled state;

FIG. 20 is a front plan view of the cradle of FIG. 17;

FIG. 21 is a top plan view of the cradle of FIG. 17;

DETAILED DESCRIPTION

Figure 7:
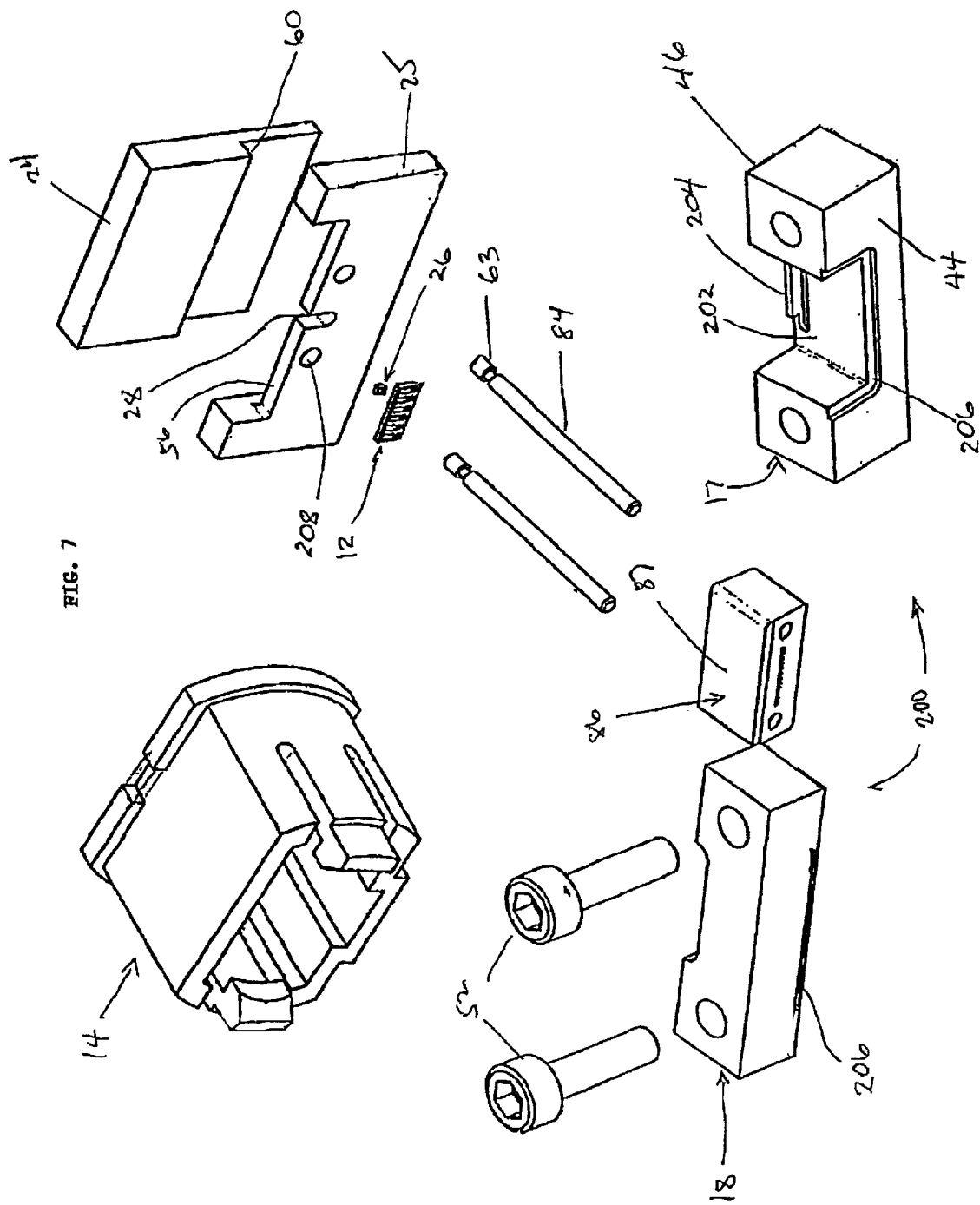
FIG. 7 is an exploded isometric view of an alternative interface unit.
Figure 10:
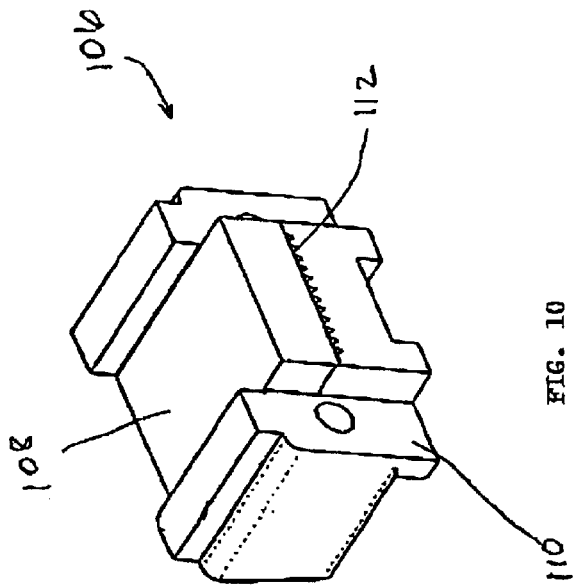
FIGS. 10–13 are various isometric views of another exemplary fiber stub array embodiment.
Figure 11:
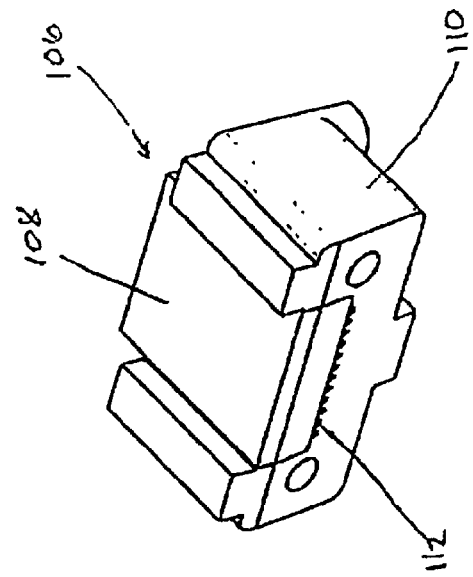

There is therefore provided according to an exemplary embodiment of the present invention, an optical interface unit for interfacing with an array of semiconductor lasers, such as for example, vertical cavity surface emitting lasers (VCSELS). Referring to FIG. 1, an exemplary optical interface unit 10 provides an interface between an optoelectronic device (not shown) and industry standard MT/MPO connectors (not shown). In broad terms, the optical interface unit axially aligns the core of a fiber with the optoelectronic device and interfaces that fiber/optoelectronic combination to an industry standard connector. This is a particularly challenging task because the light-carrying region (the core) of the optical fiber can be quite small and alignment between that region and the other components (e.g., VCSEL) require extreme accuracy to efficiently transmit/receive electrical signals. In single-mode optical fibers, for example, the core diameter of each fiber is about eight microns, and the laser to fiber alignment is typically required to be within+/−0.5–1 micron.

In one embodiment of the present invention, the optical interface unit 10 further provides mechanical stability and protection to the interface between the standardized connector and the optoelectronic device in its working environment. This is achieved in part by ensuring low insertion loss in coupling a single mode fiber to an optoelectronic device housed in an Optical Sub Assembly (OSA). Among several possibilities, this is carried out by ensuring proper axial alignment between the fiber and the optoelectronic device, setting an appropriate gap between the fiber and the optoelectronic device, and checking the optical surface conditions of either the fiber or the OSA for acceptable tolerances. Persons of ordinary skill in the art will appreciate that if adequate alignment or assembly is not achieved, this may result in reflection problems, fiber tilt issues, and erroneous air gaps between the optoelectronic device and the fiber stub array ("FSA"), and between the FSA and the fibers in the conventional connector. Stability and junction protection is generally a function of connector design (e.g., minimization of the different thermal expansion and mechanical movement effects), which this interface unit intended to achieve.

Advantageously the optical interface unit may be designed to interface with a particular OSA design so as to optimize the interface gap for the desired medium (e.g., air, epoxy, etc.). Hence, while described with specificity for coupling to a conventional MTP/MPO connector, the interface unit may be modified to fit other connectors without deviating from the scope of the present invention, such as by modifying the gap, type of slope, etc. In addition, the optical interface unit further provides a standardized interface for optical coupling between the individual fiber stubs and the terminated fibers in the standardized connector. The optical interface unit therefore maximizes coupling between an optoelectronic device and the standardized connector.

FIG. 2 illustrates an exemplary optical interface unit assembly 10 for interfacing a VCSEL array 12 with a MTP/MPO connector latch 14. In this embodiment the optical interface unit 10 includes a cradle unit 16 having a lower cradle member 17 and a cradle cover 18. The lower cradle 17 and cover 18 are configured to encase a FSA or array block 20 and to mechanically couple to a conventional MTP/MPO connector latch 14 on one side, and to a two-part VCSEL plate assembly 22 on the other.

The two-part VCSEL plate assembly 22 includes an upper ceramic substrate 24 and a lower metallic plate 25. The upper substrate 24 of this embodiment is configured to accept a monitor diode 26 positioned thereon to monitor optical output from a bi-directional emitting VCSEL array 12 and to send the monitored output to a controller or some other interface unit to regulate the laser output. As further discussed below, the monitor diode 26 is placed such that when the upper substrate 24 and the lower plate 25 are mated (such as with passive alignment equipment using a pick and place device), the monitor diode 26 is positioned subjacent to one of the VCSELs and in-line with a monitoring notch 28. The notch 28 is centrally located on the metal plate 25.

In detail, the lower cradle 17 has a generally U-shaped configuration and, in one embodiment, may be made of a weldable material such as stainless steel, Kovar, and Invar. The cradle is manufactured with two vertical support arms 30 and threaded hold-down aperture 32 on each arm. The lower cradle 17 is further configured with a stepped deck 34, created in part by disposing two generally square steps 36 on the deck's two ends and a step guide 38 on one of the two edges. The steps 36 abut the vertical support arms 30 on one side and are proximate to the first mating surface 44 on another. Between the steps 36 is a narrow channel, which defines a notch 42. The steps 36 extend opposite the first mating surface 44 and terminate shy of a second mating surface 46. As further discussed below, this creates a landing 48, which is located near the step guide 38, and both the landing and the step guide are in the general vicinity of the second mating surface 46. As further discussed below, the notch 42 and the step guide 38 work in tandem to create a close tolerance fit with the FSA 20 when the FSA 20 is encased between the lower cradle 17 and the cover 18. According to one embodiment, this close tolerance fit passively aligns the FSA to the cradle in the lateral and axial directions, or x and z directions. Furthermore, the cradle cover 18, when it comes in contact with the FSA 20, aligns the FSA in the z direction.

Although the foregoing structures have been described with specificity for controlling the lateral and axial movements of the FSA 20, and to therefore create a passive alignment between the FSA 20 and the connector latch, as further discussed below, variations in the features to accomplish same may be achieved without deviating from the scope of the present invention, and are contemplated to fall within the scope of the invention. Among other alternatives, the location and configuration of the notch and step guide may be varied without undue experimentation.

In a like fashion, two correspondingly positioned guide holes 50 are fabricated near the peripheral edges of the cradle cover 18. Thus, when the cradle cover 18 is placed over the lower cradle 17 and comes to rest thereon, the guide holes 50 and the hold-down apertures 32 coincide and are in position to receive a pair of hold-down screws 52.

Referring further to FIGS. 2 and 2A, in this embodiment of the invention, the two-part optical plate 22 is made of a dielectric upper section 24, such as ceramic, and a metal lower section 25, such as stainless steel. Like the lower cradle 17, the lower plate 25 has a generally U-shaped configuration. The center "U" section comprises a stepped upper deck 56 and a stepped lower deck 58. The stepped upper deck 56 includes a gap passage that resembles a notch 28 for allowing signals from a bi-directional laser to pass through.

In a like but opposite manner, the upper ceramic substrate 24 includes a stepped deck. Its upper deck 60 and lower deck 62 coincide with the lower plate's upper and lower decks. Still referring to FIG. 2, when the upper substrate 24 and lower plate 25 come in contact and are in a mated position, the two lower decks superimpose, and the two upper decks abut each other. A gap may be provided between the two upper decks of the upper substrate 24 and the lower plate 25. This gap would be configured to receive a pair of pinheads 63 and to roughly align the cradle assembly (including the FSA 20) to the two-part VCSEL plate 22 before final active alignment. The pinheads 63, therefore, would act like a registered key in fixing the two-part VCSEL plate 22 along a vertical direction with the cradle 16 (see, e.g., FIG. 4).

Referring again to FIG. 2, the FSA 20 comprises a single block having precision holes 64 formed in the block to retain a plurality of fiber stubs. Each precision hole 64 extending from one edge of the FSA 20 over to the other edge and defining an axial bore 66 therebetween. Thus, the FSA housing includes a plurality of axial bores for receiving a plurality of optical fibers into its interior. The described exemplary FSA 20 may be injection molded using a thermoset resin to minimize thermal expansion mismatches between the optical interface unit 10 and the OSA standardized MT connector. Also, it is understood that the invention is not limited to a specific number or range of axial bores.

The FSA 20 is confined laterally as it sits between the two-part cradle 16 by a molded male detent 68, which coincide with the notch 42 on the stepped deck 34. The male detent 68, therefore, abuts the two steps 36 on either side and is prevented from moving laterally by the steps. To fix the FSA 20 in the axial direction, the FSA 20 is further molded with a stop member 70. The stop member 70 extends from the base of the FSA 20, and, when positioned in the cradle 16, coincide with the guide 38 on the stepped deck 34. The stop member 70 abuts against the guide 38 and is prevented from moving axially towards the first mating surface 44. The FSA 20 is prevented from moving away from the cradle along the opposing axial direction by the two-part VCSEL plate 22.

Along the FSA 20 upper surface are two load-bearing members 72. The two load-bearing members 70 protrude above the FSA's top surface 74. Accordingly, when the FSA 16 is encased between the two-part cradle 16, the cradle top cover 18 comes in contact with the load bearing members 70 and not the top 74 of the FSA 20. Hence, when a pair of screws 52 are tightened against the threaded hold-down apertures 32, compressive force is generated over the two load-bearing members 72 to thereby secure the FSA 20 within the two-part cradle 16, to therefore fix the y movement between the cradle 16 and the FSA 20.

The FSA 20 further includes a pair of guidepin holes 76. Like the precision holes 64, the guidepin holes 76 extend from one edge of the FSA over to the opposing edge, which define a pair of guide collars 78 therebetween. The guide collars 78, the axial bores 64, the front mating surface 80, and the rear mating surface 82 may be molded in accordance with the IEC 1754-5 standard. As such, when the fibers from a mating conventional MT ferrule are aligned with the fibers in the FSA 20, the alignment between the various fibers is on the order of 1 micron.

The various interface components are assembled in the following manner. First, individual fibers are inserted and bonded in the precision holes 64 in the FSA 20, typically using an epoxy such as 353ND from Epoxy technology. The ends are then polished to industry standard tolerances while simultaneously maintaining the necessary length tolerances that the particular configuration requires. Next, a pair of guide pins 84 are inserted in the guidepin holes 76 with the pin heads 63 protruding out from the FSA 20. The guide pins are then secured in place by epoxy. The FSA 20 is then placed onto the lower cradle 17 and is manipulated so that the male detent 68 rests between the two steps 36 and interposed between the notch 42. A force is also exerted on the FSA 20 to move the FSA forward so that the stop member 70 abuts against the guide 38. The upper cradle 18 is then lowered over the lower cradle 17 while maintaining a rough alignment between the guide holes 50 and the threaded hold-down apertures 32. The screws 52 are then tightened over the upper cradle with sufficient amount of force to compress the load bearing members 72. Next, the MTP/MPO connector latch 14 is fit against the cradle halves 17/18 (as further discussed below) and bonded in place. The assembled components are referred to as an assembled cradle assembly 19.

The VCSEL array 12 and the photodiode 26 are mounted on the two-part VCSEL plate 22 by passive alignment equipment, such as the FINEPLACER® system. An epoxy, such as E3001 from Epoxy Technology, may be used to hold the two-part plate 22, the VCSEL 12, and the photodiode 26 in place after they have been passively aligned. Other exemplary epoxies such as EPO-Tek E3001, Dymax UV Epoxy 9-20274-GEL or similar epoxies, may be used in other exemplary embodiments. In some exemplary embodiments, different epoxies may be used for the various components of the interface unit. In an exemplary embodiment, Dymax UV Epoxy 9-20274-GEL may be used to secure the FSA to the cradle or retainer and EPO-Tek E3001 may be used to secure the VCSEL die and the monitor diode according to the exemplary embodiments in which such components are included. The assembled VCSEL plate assembly 27, is then placed over and rests on the pinheads 63 which, as discussed above, protrude out from the edge of the FSA 20. The assembled cradle assembly 19 and the VCSEL plate assembly 27 are then ready for active alignment, which is known by persons of ordinary skill in the art as including energizing the various components, aligning the fibers with the VCSEL array 12, and monitoring the laser output for maximum signal strengths. Once the desired alignment is achieved, the two-part cradle is then welded to the lower metal plate 25 by known welding methods, such as with a YAG laser. Persons of ordinary skill in the art will understand that since the pinheads 63 touch the assembled VCSEL assembly 27, the assembled cradle assembly 19 and the VCSEL assembly 27 are fixed in the Z direction Thus, during active alignment the assembled components 27 and 19 only rotate in the X, Y, and theta directions, with respect to each other. Those of ordinary skill in the art will appreciate that many variations or alternatives to the described alignment process may be implemented to achieve the desired degree of alignment.

In summary, the optical interface 10 unit accurately terminates the end faces of the fiber stubs relative to two alignment pins 84 that interface with alignment holes on the standardized connector. The VCSEL array 12 may be integrated into a plate assembly 22 having a weldable ceramic plate and a substrate for optimized coupling to the optical interface unit 10.

Details of various other optical interface unit embodiments are illustrated in FIGS. 5, 6, and 8–16. Specifically referring to FIGS. 5 and 6, in one embodiment, an FSA 86 comprises a single block having precision holes 88 formed in the block to retain a plurality of fiber stubs. Each precision hole 88 extending from one edge of the FSA 86 over to the other edge and defining an axial bore 90 therebetween. Thus, the FSA housing includes a plurality of axial bores for receiving a plurality of optical fibers into its interior.

The described exemplary FSA 86 may be injection molded using a thermoset resin to minimize thermal expansion mismatches between the optical interface unit 10 and the OSA standardized MTP/MPO connector. The FSA 86 may further include a well 92 in the upper surface of the block to dispense epoxy. Epoxy is preferable to secure the fibers in place as this eliminates the need for springs or other retention mechanisms. In addition, the FSA 86 of FIG. 5 may include a chamfer 94 on the back surface 96 to interface with the optoelectronic device 12. In other words, the chamfer 94 provides clearance for bond wires. In addition, the front side 100 of the FSA 86 interfaces with standardized connectors and therefore preferably includes an angled surface for optimal coupling with standard ferrules having single mode fibers. In a typical connection with a conventional MTP/MPO connector, this angled surface would be 8° from perpendicular (if a single mode fiber). However, depending on a particular connector, persons of ordinary skill in the art will understand that other angles may be prescribed to achieve a corresponding match without deviating from the scope of the invention, such as zero angle for a multi-mode fiber application. Also, index-matching material such as an optical gel may be used to reduce reflections at the fiber interface. According to one exemplary embodiment, optical gel NYOGEL OC-431A-LVP may be used, but other optical gels may be used in other exemplary embodiments.

In the described exemplary embodiments of FIGS. 5 and 6, the precision holes 88 accurately position the end face 96 of the FSA 86 (preferably within about+/−0.5–1 micron) and a pair of guide holes 98 in accordance with the IEC 1754-5 standard. The single block design provides high tolerances allowing for the use of the cradle assembly of FIG. 2, in conjunction with laser welding to align the optoelectronic device with the FSA 86.

Referring to FIG. 7, there is shown and described an alternate interface unit including a modified FSA 86 that sits in a modified two-part cradle 200. Instead of the stepped deck in FIG. 2, the modified two-part cradle 200 comprises a single layer deck 202. A stop member 204 is configured along one of the edges, next to the second mating surface 46. When the FSA 86 is nestled within the two-part cradle 200, the stop member 204 abuts against the base of the FSA 86 to thereby fix the FSA 86 in the axial Z direction. The modified two-part cradle 200 is configured with the same half-channel 206 as the cradle of FIG. 2. The half-channel 206 extends the perimeter of the cradle opening and acts like a grove for a corresponding tongue (not shown) on the MTP/MPO connector latch 14.

The modified FSA 86 has a general shape of a rectangular box except for one of its sides, which slightly slopes to match the angle of the conventional MTP/MPO connector. Unlike the FSA of FIG. 2, the modified FSA 86 does not have load bearing members, a notch, or a stop member. Also, axial and lateral movements between the FSA 86 and the two-part cradle 200 are performed in a modified fashion as further discussed below.

The VCSEL array 12 and photodiode 26 may be assembled to the two-part VCSEL plate 22 and passively aligned as before. However, on the lower plate 25 two axial bores 208 are provided on either side of the notch 28. These axial bores 208 have a circumference that is slightly larger than the circumference of the pinheads 63. This slightly larger circumference functions to permit mating with the guide pins 84 and still provide a rough alignment between the assembled VCSEL unit and the FSA 86. Power is then turned on to actively align the fibers with the VCSEL array 12, as discussed above for final alignment. The cradle is then welded to the lower metal VCSEL plate by known welding methods, such as with a YAG laser. Hence, a gap in the embodiment of FIG. 2 is not required, and, unlike the VCSEL plate of FIG. 4, the two upper decks 56 and 60 touch.

The FSA 86 is fixed in the two-part cradle 200 by first placing the FSA 86 on top of the lower cradle 17 over the single layer deck 202. Care is taken to abut the FSA 86 against the stop member 204. Epoxy is also applied to the base of the FSA 86 to secure it in place. The cradle cover 18 is then placed over the lower cradle 17 and a pair of screws inserted and tightened. Because the modified FSA 86 does not have any load bearing members, compression force is applied directly on the FSA housing, the top surface 87.

Figure 8:
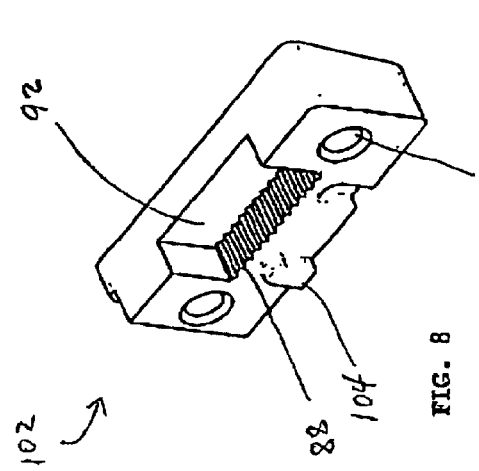
FIG. 8 is an isometric view of half of a two-part alternative fiber stub array.
Figure 9:
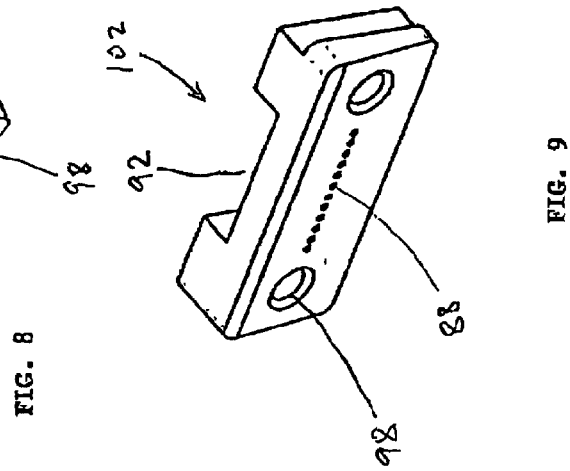
FIG. 9 is an isometric view of the other half of the two-part alternative fiber stub array of FIG. 8.

Referring to FIGS. 8 and 9 an alternate embodiment of the present invention includes forming the FSA of FIGS. 2 and 7 from two separately molded plastic blocks to aid in the manufacturability of the FSA. In this embodiment, the two-part FSA 102 again includes precision holes 88 to retain a plurality of fiber stubs that are precisely located relative to the guide-pin holes 98. However, in the alternate two-part embodiment 102, the precision holes 88 need not be aligned from one side to the other. Rather, the use of two array blocks allows for the alignment of the fiber holes and guide pins with one piece of mold steel for each of the front and rear optical surfaces during the molding process. Persons of ordinary skill in the art will understand that the two-block design may therefore reduce tooling costs and provide increased yields with more accurate precision than the single block design of FIGS. 2 and 7.

In addition, each half of the molded block may include a well 92 formed on the upper surface to capture any overflow when excess epoxy is used to secure the fibers in place. The two half blocks may further include mechanisms to assist in aligning the blocks. For example, a tongue and groove type mechanism 104 may be included on each of the blocks as shown to mechanically align the blocks when bonded together with an epoxy or other bonding materials known in the art. Also, because of the well 92, portions of the precision holes are actually half-circles and not "precision holes."

Figure 13:
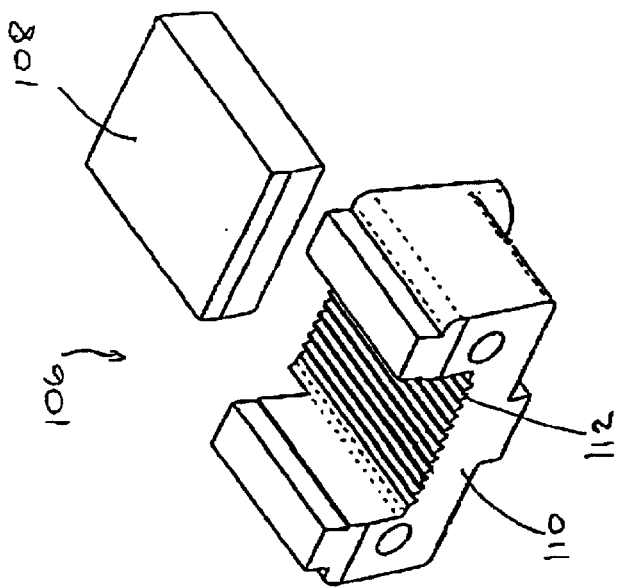
Figure 12:
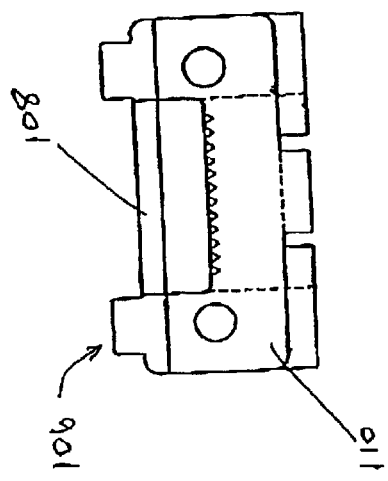

Referring to FIGS. 10–13, a further alternate embodiment of the FSA 20 of FIG. 2 may again be formed from two blocks. In the described exemplary two-part embodiment 106, either the inside surface of the upper 108 or lower 110 blocks (or both) include nested V-grooves 12 to retain a plurality of fibers. For ease of manufacturing the V-grooves 112 may be formed in a single surface with the opposing surface being flat to rigidly secure the fibers in the nested grooves. When the upper block 108 is superimposed over the lower block 10, the adjoining V-grooves 112 and flat surface form axial bores in the resulting block. As before, two end grooves are provided. The end grooves are precisely located relative to the guide-pin holes that are designed in accordance with industry accepted standards. Advantageously the use of nested V-grooves having flat side walls facilitates the use of silicon grown tooling rather than more expensive metal tooling. The nested V-groove further allows the fiber to be rigidly secured relative to the end grooves without the use of springs or other secondary retention mechanisms. In addition, the nested V-grooves may register the fiber with greater accuracy than the cylindrically shaped axial bores of FIGS. 2 and 7. This is because by definition, the axial bore must be larger in diameter than the fiber itself in order for the fiber to pass through. Thus, this allows for some level of movement/misalignment of the fibers. To illustrate how the V-grooves 112 enhance alignment, FIG. 13 is a perspective view of the FSA 106 of FIGS. 10–12 with the upper cover 108 removed. In this figure, a person of ordinary skill in the art will understand that the area of the V-grooves 112 allows the fibers to directly register with the flat V side wall portions of the V-grooves 112 in the molded block. Due to the fiber's cross-sections being circular, and that the three points of contact created by the V-groove side walls of a V-groove 112 and the upper cover define a circle, the all the fibers are biased to the bottoms of the grooves. This is difficult in a circular axial bore arrangement as there is no active force that pushes the separate fibers to similar positions in the precision holes.

Figure 14:
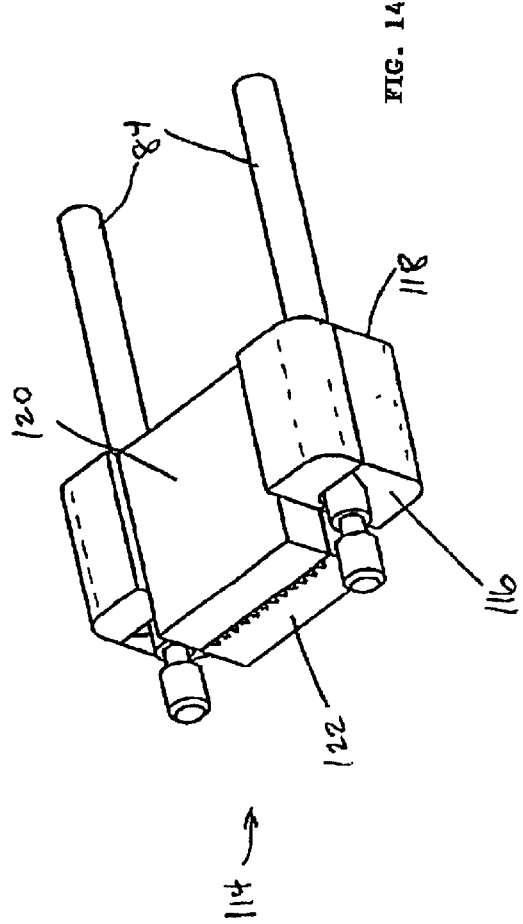

Referring to FIGS. 14–16, in an alternate embodiment, the V-groove design of FIGS. 10–13 is further modified to allow the V-grooves and the guide holes to be molded or cast from a single tool. In particular, the modified FSA 114 further includes V-grooves for the guide pins. The passageways for the guide pins extend longitudinally from a back end 116 of the housing toward its front 118 through the entire length of the housing. The V-grooves (both for the fibers and guide pins) may again be formed in a single surface on the same block 122. The opposing lower surface of the upper block 120 may again be flat. When the upper block 120 is superimposed over the lower block 122, the adjoining V-grooves and flat surface form axial bores in the resulting block that are interposed between two end grooves.

The end grooves are precisely located relative to the guide-pin holes and are designed in accordance with industry accepted standards. Advantageously the alternate design may allow for the use of open/closed tooling having superior repeatability and reduced costs relative to the design of FIGS. 2 and 7. In addition, the use of a single tool element to form the V-grooves may allow the V-grooves to be more accurately registered relative to the guide holes and precision holes, as previously discussed.

Referring to FIGS. 17–19, there is shown yet another interface embodiment 124, which includes a one-piece retainer 126, a modified snap connector 128, and a retainer wedge 130 to wedge an FSA 132. The tongue and groove in this embodiment has been reversed. Accordingly, the retainer 126 has a continuous tongue 134 along a first mating surface 136 for alignment with a corresponding groove or channel (not shown) in the snap connector 128. In the embodiment of FIGS. 17–19, a notch is not used to fix the FSA 132 laterally. Instead, the one-piece retainer 126 uses a combination of registered side wall and retainer wedge 130 to fix the x-y direction and a similar notch and epoxy to fix the axial direction.

Referring more particularly to FIGS. 17 and 20, the one-piece retainer has a generally rectangular opening 138 which defines a cavity therein for receiving the FSA 132. Just slightly in from the opening 138 and axially removed from the first mating surface 136, there is shown a sloping side wall 140 and a raised floor 142. As further discussed below, the sloping side wall 140 has a slope that is identical or approximate to that of a side wall on the FSA 132. The sloping side wall 140 runs continuously from a first starting position near the first mating surface 136 to a second position towards a second mating surface 146. Accordingly, when the FSA 132 is slidably positioned in the one-piece retainer 126 and the wedge 130 is inserted, the two sloping surfaces (of the retainer and of the FSA) coincide and abut to restrain the FSA from lateral movement with respect to one another.

The raised floor 142 extends approximately the width of the opening 138 and the depth of the one-piece retainer 126. As indicated in FIGS. 20 and 21, a notch 144 at the tip of the raised floor along the back side is provided, opposite the side with the tongue 134, near the second material surface 146. This notch 144 is configured to stop the FSA 132 from moving any closer to the VCSEL array when the various components are mechanically and electrically coupled together, thus fixing the gap between the FSA and the VCSEL array.

Several apertures are provided in the one-piece retainer 126. A connector threaded retaining aperture 148 is configured on the first mating surface, just above the opening 138, and provides a gripping surface for a screw. As understood from FIGS. 17 and 19, this threaded aperture is partly responsible for fixing the snap connector 128 to the one-piece retainer 126. Two other apertures are a wedge well 150 and a gripping well 152. The wedge well 150 extends through the entire height of the one-piece retainer 126 and partially intersects the cavity along the non-sloping surface side wall of the retainer 126. The shallow gripping well 152 is beveled and is provided so that the retainer is easily gripped by the alignment tooling as the components are actively aligned. As indicated in FIG. 20, the gripping well 152 does not extend through into the cavity region and is preferably centrally located along the top of the one piece retainer adjacent the wedge well and terminates directly over the threaded aperture 148. Two enlarged cut-outs 145 in the central cavity of the retainer 126 are shown. These enlarged cut-outs 145 are included to relief the cutter when the cutter is used to create the cavity during the manufacturing process. However, they are not required if other manufacturing steps are employed.

Figure 24:
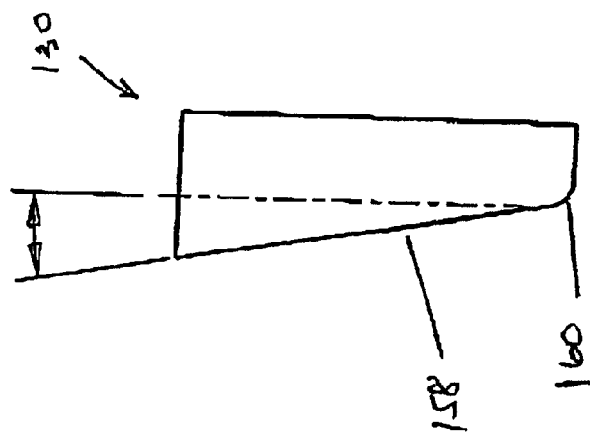
FIGS. 22–24 are various plan views of the wedge of FIG. 17.
Figure 23:
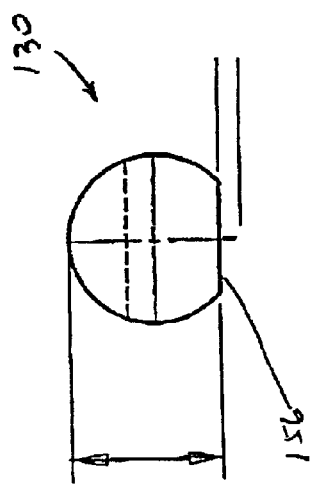
Figure 22:
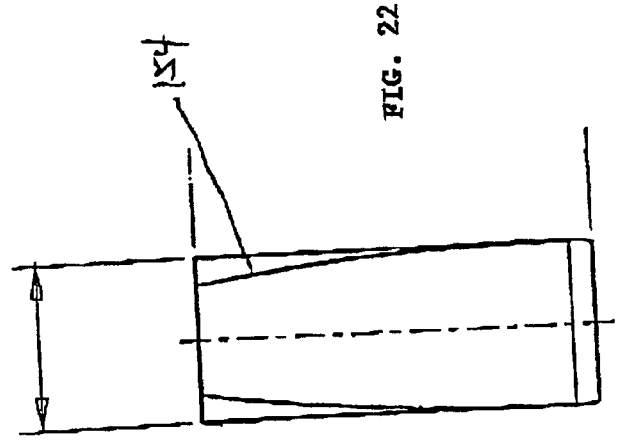

Referring to FIGS. 22–24, there is shown and described a retainer wedge 130. The retainer wedge 130 may be made of the same material as the one-piece retainer (e.g., a weldable metal such as stainless steel). The retainer wedge is rod-like in shape and is tapered lengthwise along one direction 154. The wedge 130 includes a cut section 156 along the arch circle and in the lengthwise direction. In the same cut region, the wedge is also tapered inward 158. At the end of the tapered section, the cut region also includes a beveled surface 160 to allow for easy passage over the FSA 132 as the wedge is inserted into the wedge well 150. Referring again to FIG. 17, there is shown and described a modified MTP/MPO connector latch 162. As before, the MTP/MPO connector latch 162 includes a recessed section (not shown) which corresponds to the tongue 134 on the one-piece retainer 126 and fits with the tongue 134 in a tongue and groove fashion. The modified MTP/MPO connector latch 162 also includes a pair of latching arms 164 as before to latch with tabs or other detents in the conventional mating MTP/MPO connector/ferrule (not shown). The modified MTP/MPO connector latch 162 further includes a notch 166 along the upper flange 168. This notch 166 is in-line with the threaded aperture 148 as the latch and the retainer are mated and allows a screw 170 to pass through to fasten the MTP/MPO connector latch to the retainer.

Figure 26:
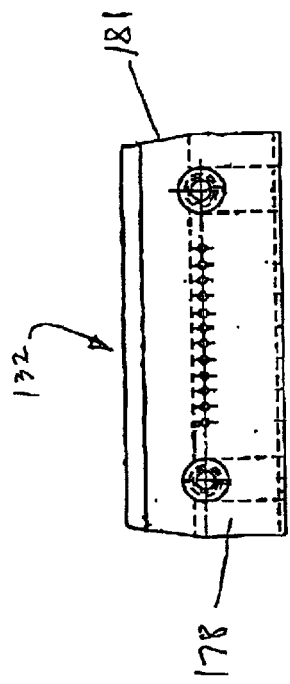
FIGS. 25 and 26 are plan views of yet another fiber stub array embodiment.
Figure 25:
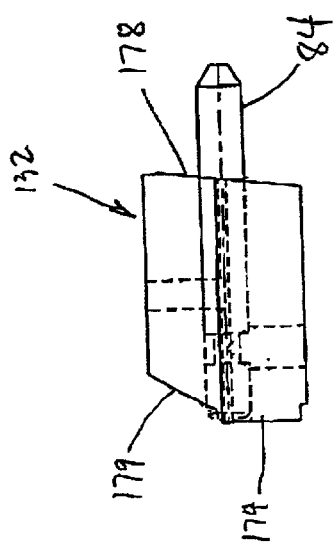

The FSA 132 in FIGS. 17, 25 and 26 is similar to the FSA in FIGS. 2 and 5 with some exceptions. First a pair of round wells 172 are provided to relieve excess epoxy as epoxy is applied to fasten the guide pins into the guide holes. Second, the guide pins do not extend beyond or out of the FSA along the back surface 174. This is partly due to the way the retainer/FSA combination is aligned to the VCSEL plate, as further discussed below. In addition to a tapered front surface 178 for mating with a tapered conventional MTP/MPO ferrule for a single mode application, the back surface 174 is also tapered along the back surface upper region 179. This tapered back upper region 179 is configured to allow clearance for wire bonding. The side is also tapered 181. This taper has the same slope as the wedge slope 158 and the sloping side wall 140 for a close fit.

Figure 27:
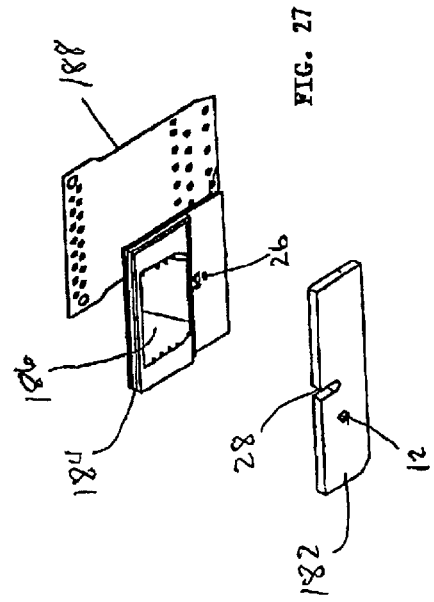
FIG. 27 is an exploded view of the exemplary optoelectronic plate of FIG. 18.

Referring to FIGS. 18 and 27, the two part VCSEL plate assembly, as before, includes a lower metallic VCSEL plate 182 and an upper ceramic substrate 184. In part for EMI protection, the ceramic substrate is further configured with a ground plain 186 which provides both electromagnetic shielding and electrical grounding for the VCSEL array. The ceramic substrate 184 is shown with a flex circuit 188 and is generally provided to couple the OSA to a PC board or other electronic substrates.

Still referring to FIGS. 18 and 27, the flex circuit may be wire bonded to the ceramic substrate via traces embedded in the substrate. The flex circuit 188 in this embodiment contains coplanar transmission lines. The coplanar transmission line based flex circuit preferably provides high speed characteristics while being thinner than conventional flex circuits. Due to its relatively small thickness, the coplanar transmission line based flex circuit may result in smaller bending radius when bent for coupling to the PC board or the like. This reduced bending radius may then result in reduced signal distance between the lasers and the PC board and theoretically leads to better signal performance.

As before, passive alignment between the VCSEL array, photodiode, ceramic substrate, and VCSEL plate to produce a VCSEL plate assembly is performed by prior art methods such as pick and place using the FINEPLACER® system. Referring to FIG. 17, passive alignment between the one-piece retainer 126, the FSA 132, and the MT connector latch 162 may be performed in the following fashion. First, the FSA 132 is inserted into the cavity from the first mating surface 136. The FSA 132 is pushed back until it buts against the notch 144. (See in addition FIG. 20.) The wedge 130 is then inserted into the wedge well 150 with the cut surface 158 facing the FSA 132. A set screw 131 is then placed into the well and tightened. As the set screw 131 is rotated, it imparts pressure to the wedge 130, which in turn pushes against the side of the FSA 132. Through translation, the FSA 132 is biased against the sloping side 140 of the one-piece retainer 126. Epoxy is then applied to the FSA 132 to fix the FSA in the axial direction. The assembled FSA and retainer is referred to as a retainer assembly component.

Passive alignment between the MTP/MPO connector/MT ferrule and the retainer assembly component is achieved by sliding the MTP/MPO connector latch 162 over the tongue 134 to register in a tongue and groove fashion. The hold down screw 170 is then tightened by sliding the tip of the screw past the notch 166 located at the connector flange 168 and into the threaded aperture 148. Next, a conventional connector/ferrule is inserted and snaps with the MTP/MPO connector latch 162. The MTP/MPO connector latch 162 is configured to slide the conventional connector/ferrule through conventional registration 165. As the MTP/MPO connector slides forward to a final gripped position, the two guide holes on the MT ferrule engage the pair of guide pins 84 on the FSA 132. As the conventional connector/ferrule is further slid into the MTP/MPO connector latch, the close tolerance between the guide pins 84 and the guide holes on the conventional MT ferrule provide the final alignment. As previously discussed, this final passive alignment between the fibers in the conventional connector and the fibers in the FSA 132 is within +/−0.5 to 1 micron.

The final alignment between the VCSEL plate assembly and the retainer assembly component is performed by active alignment. This is accomplished by powering up the lasers and emitting signals to the fibers. At the same time, the retainer assembly component and/or VCSEL plate assembly is manipulated in the x, y and theta directions (theta is the rotation between the x-y plain), and signal strength is monitored. Once maximum signal strength is achieved, the retainer to the VCSEL plate is welded with known welding methods, such as with a YAG laser. The entire interface unit is now globally aligned. Hence, when the embodiment of FIG. 19 (and the various other embodiments) is used in the field, all that is required is to insert a conventional MTP/MPO connector for a satisfactory alignment.

Although the passive alignment embodiment in FIGS. 17 and 18 is described with particularity, other alignment arrangements are contemplated and are considered to fall within the scope of the present invention. This includes switching the sloping side for the other side wall, changing the notch to locate near the second mating surface, and providing a raised floor with a different configuration, just to name a few.

Figure 28:
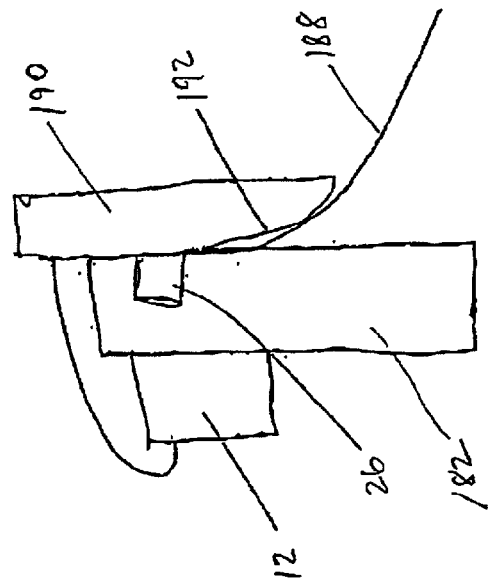
FIG. 28 is an alternative embodiment of the optoelectronic plate of FIG. 18.

Referring to FIG. 28 yet another alternative embodiment is illustrated. In this embodiment, the ceramic substrate of FIGS. 18 and 27 is exchanged for a metal backing plate 190, which may be made of a weldable metal such as stainless steel. The backing plate 190 has no conductive traces, and accordingly, the flex circuit 188 is directly coupled, both mechanically and electrically, to the photodiode 26 and the VCSEL array 12 through wire bond methods. Thus, signal distance is further reduced from the embodiment in FIGS. 18 and 27 due to fewer or shorter traces. As discussed above, this should theoretically lead to better signal performance.

Still referring to FIG. 28, the VCSEL plate 182 is the same as before (see, for example, FIGS. 18 and 27) and includes the same notch 28 for signal transmission from a bi-directional VCSEL array to pass through. The backing plate 190 has a configuration that resembles a rectangular block. However, instead of having perfectly square edges, the backing plate 190 has a taper surface 192 on one of its sides. This taper surface 192 allows the flex circuit 188 to bend and couple to a PC board or other electrical substrates while minimizing the distance of the flex circuit and traces on the ceramic substrate. Thus, this should theoretically lead to better signal performance.

Figure 29:
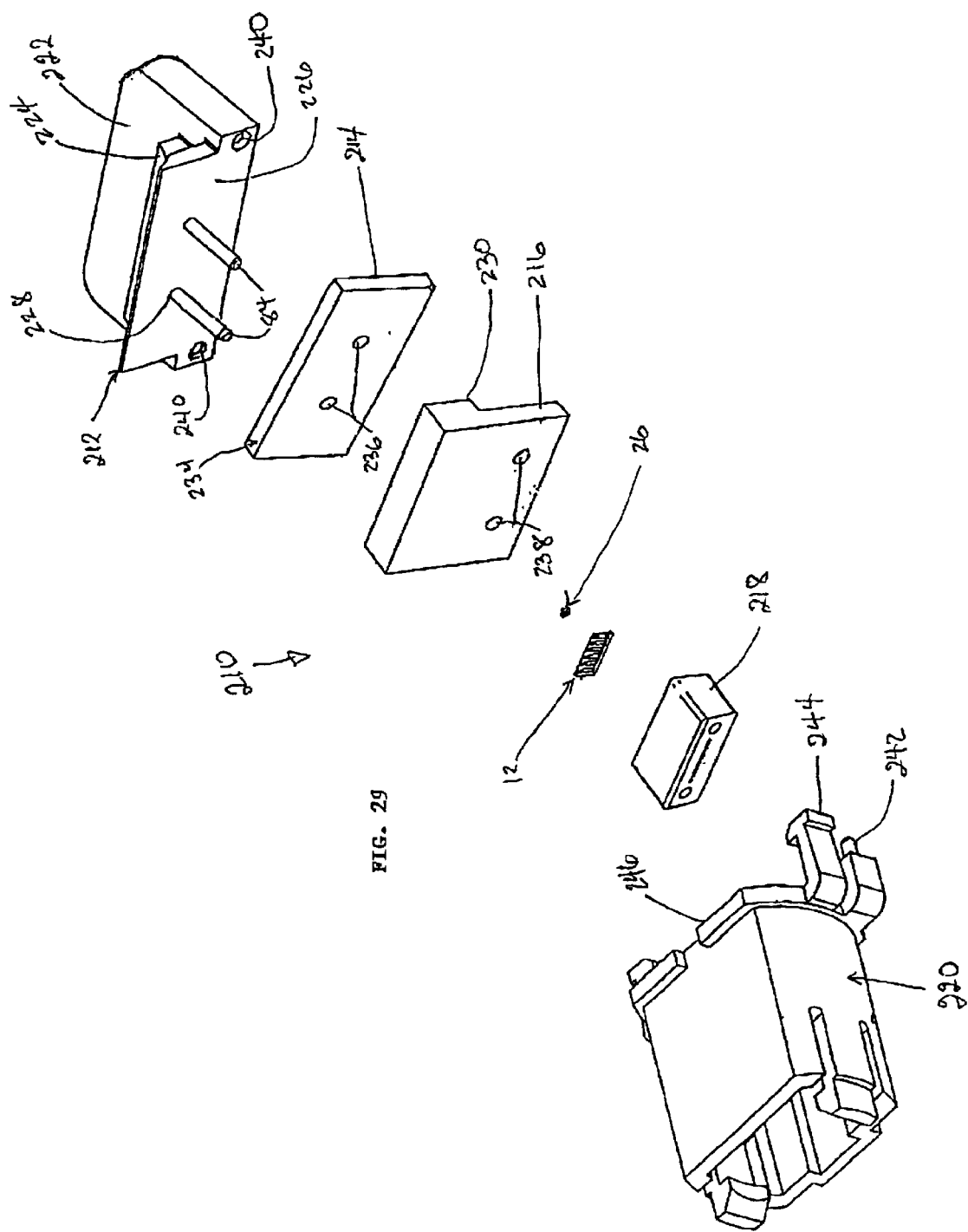
FIG. 29 is an exploded isometric view of yet another alternative interface unit.

FIG. 29 is still yet another alternative embodiment. In this embodiment, the retainer has been eliminated to further reduce the number of components involved. In one embodiment, the interface unit 210 includes a metallic base unit or pin plate 212, a weld plate 214, a ceramic substrate 216, a monitor diode 26 and VCSEL array 12, an FSA 218, and a modified MTP/MPO connector latch 220. The base unit or pin plate 212 may be made of a weldable material such as stainless steel and resembles two integrated plates at a right degree angle. However, a solid rectangular block and other angles are also contemplated depending on the particular application.

The horizontal section 222 includes a reinforcement member 224 for reinforcing the joint between the horizontal section 222 and the vertical section 226. However, no reinforcement is contemplated where the application has little or no exertion force. Two guide pins 84 are pressed fit into a pair of guide holes 228 along the vertical section 226 of the pin plate 212. As further discussed below, these guide pins provide a course alignment between the VCSEL array 12 and the optical fibers, and a finished passive alignment for the FSA 218 and the conventional connector/ferrule.

Among several modifications, the embodiment of FIG. 29 reverses the order of the ceramic substrate 216 and the weld plate 214. Unlike the embodiments of FIGS. 2, 7 and 18, the VCSEL array 12 is bonded to the ceramic substrate 216 and not the weld plate 214. The ceramic substrate 216 includes an overhang section or a ledge 230. The ledge is configured to sit and rest over the top surface 234 of the weld plate 214. In the rested position, a pair of oversized alignment holes 236 on the weld plate 214 match and coincide with a similar pair of oversized alignment holes 238 on the ceramic substrate. The two pairs of oversized alignment holes 236 and 238 are considered oversized when viewed with respect to the diameter of the guide pins 84. In other words, the guide pins 84 and the oversized alignment holes are in a loose fitting arrangement, unlike the fit between the guide holes 228 on the base unit and the guide pins 84.

As discussed above, the VCSEL array 12, the photodiode 26, the ceramic substrate 216, and the weld plate 214 are first passively aligned and bonded using an alignment device such as the FINEPLACER® system. The bonded and aligned components, also referred to as a VCSEL plate assembly, are then coupled with the pin plate 212 via passing the guide pins 84 through the alignment holes 236 and 238. The FSA 218 is then slid over the guide pins 84 and placed adjacent the VCSEL plate assembly. Like before, this provides a rough alignment between the VCSEL array and the fibers in the FSA 218 in the X, Y and theta directions.

The modified MTP/MPO connector latch 220 is then mounted over the pin plate 212.

This is accomplished by providing a pair of connector guide holes 240 along the opposing ends of the lower edge of the pin plate 212. Regarding the modified MTP/MPO connector latch 220, a pair of placement pins 242 and a pair of latch arms 244 along the two edges of the connector flange 246 are provided. Unlike a tongue and groove arrangement of FIGS. 2 and 7, the present embodiment uses the combination of placement pins 242 and latch arms 244 to connect to the pin plate 212, and uses no tongue or groove on the flange 246. The latch arms 244 include a male detent 248 on each arm. Each male detent is configured to deflect as the MTP/MPO connector 220 is inserted over the pin plate and to spring back and grip the sides of the vertical section 226.

Active alignment is performed by connecting a fiber array jumper with a modified MT-like ferrule to the guide pins. This alignment ferrule enables alignment while not crushing any wirebonds. Signal strength is then monitored at the other end of the fibers while the VCSEL plate assembly is manipulated about the loose fitting oversized alignment holes 236 and 238. Once maximum signal strength is achieved, the alignment is captured by permanently welding the weld plate 214 to the pin plate 212. The alignment ferrule is then removed and replaced by the FSA which is then bonded in place.

Figures 30, 31, 32:
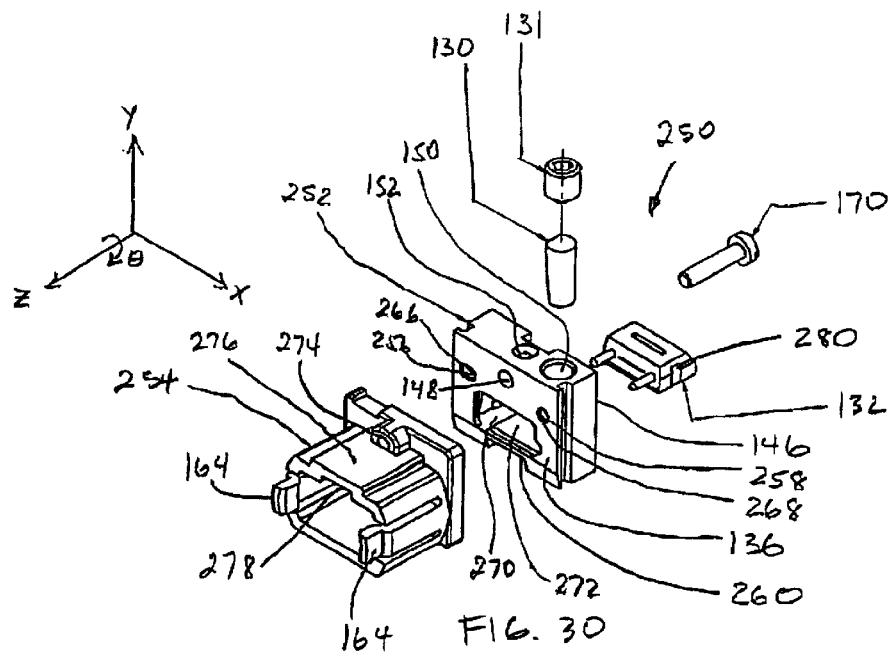
FIG. 30 is an exploded isometric view of yet another alternative interface unit.
FIG. 31 is an isometric view of a portion of the interface unit of FIG. 30 from a another perspective.
FIG. 32 is an isometric view of the alternative interface unit of FIG. 30 rotated 180 degrees and in an assembled state with a VCSEL plate subassembly.

FIG. 30 is yet another alternative embodiment of an interface unit provided in accordance with practice of the present invention. As in the embodiment of FIG. 17, the present exemplary interface unit 250 comprises a modified one-piece retainer 252, a modified snap connector 254 (also sometime referred to as a connector latch), and a wedging feature for securing and aligning the FSA 132. In more detail, the modified one-piece retainer 252 utilizes a pair of alignment holes 256, 258 and a female detent 260 in lieu of a tongue 134 design of FIG. 17. As further discussed below, the pair of alignment holes 256, 258 allow the modified snap connector 254 to align itself with the one-piece retainer 252 through a pair of mating alignment pins 262 (FIG. 31). In addition, the female detent 260 is configured to receive the connector detent 264 (FIG. 31) to therefore further removably secure the snap connector to the one-piece retainer.

In an exemplary embodiment, one of the pair of alignment holes 256, 258 is machined with a generally oval shape aperture 266 and the other alignment hole is machined with a generally circular aperture 268. This may be provided, for instance, to minimize machining precision requirement between the centerlines of the two alignment holes 256, 258 with respect to the alignment pins 262. Accordingly, when the modified snap connector 254 is mechanically coupled to the one-piece retainer 252, the centerlines between the two alignment pins 262 can vary slightly with respect to the centerlines of the alignment holes 256, 258 without inhibiting the snap connector's ability to couple with the one-piece retainer 252. Alternatively, the generally oval aperture and the generally circular aperture may be switched so that the generally oval aperture is located on the right side and the generally circular aperture is on the left side (when view from the perspective of FIG. 30). However, where precision is demanded, the pair of alignment holes 256, 258 may both instead be machined with circular apertures.

Referring to FIG. 30 in addition to FIG. 31, the female detent 260 is located just below the central opening 270 on the one-piece retainer 252. This location coincides with the connector detent 264 on the snap connector 254, and, accordingly, is configured to receive the connector detent 264 when the snap connector is mechanically coupled to the one-piece retainer 252.

As with the one-piece retainer in FIG. 17, the central opening of the one-piece retainer 252 defines a passage 272 in which the FSA 132 may be received. The passage 272 contains essential features that are similar to the one-piece retainer 126 of FIG. 17, including the sloping side wall 140, the raised floor 142, the notch 144 for fixing the Z gap between the FSA 132 and the conventional MTP/MPO connector, the wedge well 150, and the gripping well 152. In addition, the one-piece retainer has a similar first mating surface 136 and a second mating surface 146. However, in an exemplary embodiment, the retaining aperture 148 on the one-piece retainer to 252 has been modified to receive the fastener 170 in a slightly different fashion. The retaining aperture 148 is configured to allow the fastener 170 to pass through when the fastener is inserted starting from the second mating surface 146, through the first mating surface 136, and to a receiving threaded locking hole 274 on the snap connector 254, where the fastener 170 may be tightened to removably secure the one-piece retainer 252 with the snap connector 254. Among other things, the modified retaining aperture arrangement permits modification to the snap connector 254. In an exemplary embodiment, the top 276 of the snap connector 254 is modified to include keyway 278 for orientation of the mating MTP/MPO connector. Among other things, this keyway 278 ensures correct fiber-to-source/detector connection (e.g., fiber 1 to laser 1 and fiber 2 to laser 2).

Referring again to FIG. 30, and more specifically to the FSA 132 in FIG. 30. The FSA 132 is provided with a notch 280. Thus, when the FSA is inserted in the one-piece retainer 252 and aligned as discussed above for the embodiment in FIG. 17 (i.e., aligned by fixing the side of the FSA with the wedge 130 and then performing passive and active alignment), epoxy may be added, which would then flow into the notch 280 and then cured. In effect, the notch 280 acts like a keyway and the epoxy like a key when cured to secure the FSA 132 within the one-piece retainer 252.

Referring to FIG. 32, the assembled, aligned, and welded (i.e., the VCSEL plate subassembly 282 is welded to the second mating surface 146 after global alignment is performed, which may alternatively be secured by epoxy instead of welding as previously discussed) interface unit 152 is depicted in a 180 degree rotation from the perspective of FIG. 30. The passage for adding epoxy into the notch 280 is via wedge well 150, which, as previously discussed for FIG. 17, extends the entire height of the one-piece retainer 252. Because it extends the entire height of the one-piece retainer, the wedge well 150 is well-suited for accepting epoxy and allowing the epoxy to flow to the various crevices within the passage 272.

To further secure the FSA 132 within the one-piece retainer 252, in an exemplary embodiment, additional passages for adding epoxy may be machined in the one-piece retainer 252, such as epoxy access hole 284. Like the wedge well 252, the epoxy access hole 284 defines a passage which flows into the main passage 272 in the central opening 270. Thus, if and when epoxy is added, epoxy may flow to the various crevices to further secure the FSA within the one-piece retainer.

As for material selections, although stainless steel was disclosed as an exemplary material for the cradle and retainer, among others, and ceramic for part of the VCSEL plate subassembly, material selections may be based on the coefficients of thermal expansion of the various components, including the FSA, the ceramic plate, the guide pins, and the retainer. Generally speaking, the coefficient of thermal expansion for the ferrule may be helpful in establishing the material selections for the various components of the optical interface unit. For a typical or conventional ferrule per industry standard, the following exemplary materials may be used: Valox 420 SEO, 30% glass filled PBT for the snap connector; a silica filled thermoset base for the FSA; 17-4PH/H1150 SST for the VCSEL plate, the wedge, and the retainer, 420 S.S. for the guide pins; and LTCC for the ceramic plate. Such materials are exemplary only and it is also envisioned that other materials with similar or substantially equivalent coefficients of thermal expansion are available and therefore may be used in implementing the various embodiments of the invention disclosed herein. Accordingly, these alternate material selections are understood to fall within the scope of the invention.

It should be understood that the foregoing embodiments are exemplary only and that the present invention includes various other configurations which allow for passive alignment in at least one direction or orientation and active alignment in the remaining directions or orientations. Various mechanical stops or keys may be used to restrict the relative motion between the various components once they are engaged and globally aligned and before active alignment. The present invention covers substrate and subassemblies including additional or fewer components than shown in the various exemplary embodiments, including a VCSEL plate subassembly without monitor diode. In addition, various monitoring techniques may be used which provide a monitor capable of receiving a proportionate fraction of emitted light from data lasers or extra lasers which may emit in one or both of opposed directions. Furthermore, while the invention is disclosed with specificity for a VCSEL array, the same design may be used for other optoelectronic devices such as receivers and transceivers.

What is claimed is:

1. An optical interface assembly for interfacing a fiber optical connector to an optoelectronic device, said assembly comprising a retainer unit, the retainer unit including:
   (i) a rectangular opening for receiving a fiber stub array, the opening and fiber stub array each having a sloping side wall, wherein the slope of the side wall of the opening is substantially the same as the slope of the side wall of the fiber stub array, and
   (ii) a wedge well for receiving a wedge such that when the fiber stub array is placed in the retainer unit and a wedge is inserted into the wedge well, the sloping side walls of the opening and fiber stub array are mated together and the fiber stub array comes in contact with the wedge, thereby fixing the fiber stub array in position.

2. The interface assembly of claim 1, further comprising a two part plate assembly with provision for accepting an optoelectronic device, said two part plate assembly being mechanically coupled to said retainer by at least one of welding and applying epoxy.

3. The interface assembly of claim 1, further comprising a two part plate assembly and a connector latch, said two part plate assembly and said connector latch mechanically coupled to either side of the retainer.

4. The interface assembly of claim 1, wherein the retainer includes a notch along a base, and wherein said notch is configured to fix the fiber stub array in the axial direction.

5. The interface assembly of claim 1, wherein the fiber stub array includes a plurality of passageways and at least one guide bore, said passageways and said guide bore are axially aligned to IEC 1754-5 standard.

6. The interface assembly of claim 1, wherein the fiber stub array includes a well for relieving excess epoxy, a sloping front face for mating with the conventional connector, and a sloping rear face for wire bonding.

7. The interface assembly of claim 1, further including register means and a latch means for locating a conventional connector latch with respect to the retainer and for coupling the latch and the retainer.

8. The interface assembly of claim 1, wherein the fiber stub array is made of a first member and a second member and wherein the first and second members have keying features for alignment.

9. The interface assembly of claim 1, wherein the retainer is welded to a VCSEL plate assembly.

10. The interface assembly of claim 1, further comprising a plurality of V-grooves axially disposed within the fiber stub array.

11. The interface assembly of claim 1, further comprising a VCSEL plate assembly having a VCSEL array and a photodiode mounted thereon, wherein the VCSEL plate assembly is mechanically coupled to the retainer.

12. An optical interface connector for connecting a ferrule to an optoelectronic device comprising a base unit, optoelectronic plate, fiber stub array, and connector latch,
   said connector latch having detents and keying features for coupling the connector latch to the base unit,
   said base unit comprising at least one guide pin passing through the optoelectronic plate and fiber stub array; and
   wherein said optoelectronic plate includes at least one alignment hole in a loose fit engagement with the at least one guide pin to thereby permit said optoelectronic plate to move in at least one of x, y and theta direction with respect to said base unit.

13. The interface connector of claim 12, wherein the optoelectronic plate comprises a first weld plate and a second ceramic substrate, and wherein the first plate is coupled to the base unit by welding.

14. The interface connector of claim 12, further including a VCSEL array and a photodiode in passive alignment with the optoelectronic plate.

15. The interface connector of claim 12, wherein the fiber stub array is made of a first member and a second member and wherein the first and second members have keying features for alignment.

16. The interface connector of claim 12, wherein the optoelectronic plate includes a ledge for registration between a first plate portion and a second plate portion.

17. The interface connector claim 12, wherein the optoelectronic plate is welded to the base unit after the optoelectronic plate has been actively aligned with a conventional connector.

18. The interface connector of claim 12, wherein the connector latch is configured to accept a conventional ferrule and wherein the ferrule is configured to push the fiber stub array from a first position to a second position towards the base unit as the ferrule is received by the connector latch.

19. The interface connector of claim 12, further comprising a second guide pin for registering the components along approximately a single plane.

20. The interface connector of claim 12, further comprising a plurality of V-grooves axially disposed within the fiber stub array.

21. An optical interface unit for coupling an optoelectronic device to a fiber connector, said interface unit comprising a cradle unit, a fiber stub array, a VCSEL plate assembly, and a connector latch; said cradle unit including a lower and upper cradle member, said lower cradle member having a generally U-shaped configuration so that the cradle unit is configured to encase said fiber stub array and to fix an alignment gap between said fiber stub array and said VCSEL plate assembly; said VCSEL plate is configured to accept a VCSEL array and to permit signals from said VCSEL array to pass to a photodiode, which is mounted sub-adjacent to the VCSEL array; said connector latch is configured to couple to said cradle by at least one of epoxy detents, and restriction from a screw; and wherein said cradle is attached to said VCSEL plate assembly by at least one of welding and applying epoxy.

22. The interface unit of claim 21, including a wedge and a wedge hole for limiting the fiber stub array from moving laterally.

23. The interface unit of claim 21, wherein the cradle includes a cavity having four sides and wherein one of the sides has a slope.

24. The interface unit of claim 21, wherein the cradle includes a notch and a guide for limiting the fiber stub array from moving axially and laterally with respect to the cradle.

25. The interface unit of claim 21, further comprising a pair of guide pins fixedly attached to a pair of guide holes on the fiber stub array, said pair of guide pins is configured to guide sad conventional connector and to align a plurality of fibers within said conventional connector to a plurality of fibers in said fiber stub array to about less than+/−1 micron.

26. The interface unit of claim 21, wherein sad fiber stub array includes an upper portion and a lower portion and further includes a plurality of V-grooves disposed axially on the lower portion.

27. An optical interface device comprising:
    a plastic fiber stub array housing having a plurality of axial passageways for receiving a plurality of optical fibers, each of said plurality of passageways extending longitudinally from a first optical surface to a second optical surface, and alignment guide holes extending longitudinally from the first optical surface to the second optical surface wherein said axial passageways are precisely aligned with said alignment guide holes;
    a cradle unit including a lower and upper member for encasing the plastic fiber stub array housing and at least one protrusion for keying the plastic fiber stub array housing in at least one direction; and
    a connector latch in mechanical communication with the cradle by at least one of epoxy, detents, and pressure from a screw, and wherein the connector latch has an opening for receiving a conventional fiber optic connector.

28. The optical interface device of claim 27, wherein the plastic housing comprises an upper portion and a lower portion and wherein the plurality of passageways are disposed along the lower portion.

* * * * *